United States Patent [19]
Peiffer et al.

[11] Patent Number: 5,736,180
[45] Date of Patent: Apr. 7, 1998

[54] SPICE IMPREGNATED EDIBLE WRAPPING FOIL

[76] Inventors: Bernd Peiffer, Theodor House Strasse 13, D-69234 Dielheim; Joachim Keil, Alte Landstrasse 36, D-69469 Weinheim; Franz Maser, G7 35, D-68159, Mannheim, all of Germany

[21] Appl. No.: 507,242

[22] PCT Filed: Oct. 14, 1994

[86] PCT No.: PCT/EP94/03395

§ 371 Date: Nov. 13, 1995

§ 102(e) Date: Nov. 13, 1995

[87] PCT Pub. No.: WO95/17100

PCT Pub. Date: Jun. 29, 1995

[30] Foreign Application Priority Data

Dec. 21, 1993 [DE] Germany ............ 43 43 670.6

[51] Int. Cl.⁶ ........................... A23L 1/221; A23L 1/48
[52] U.S. Cl. ................ 426/138; 426/92; 426/96; 426/140; 426/652; 426/653
[58] Field of Search ............................. 426/112, 415, 426/129, 130, 132, 135, 138, 140, 92, 96, 652, 653, 642, 113, 412

[56] References Cited

U.S. PATENT DOCUMENTS

| | | | |
|---|---|---|---|
| 1,589,106 | 6/1926 | Campbell | 426/132 |
| 2,357,258 | 8/1944 | Harris | 426/112 |
| 2,759,830 | 8/1956 | Touceda | 426/132 |
| 3,041,289 | 6/1962 | Katchen et al. | 426/415 |
| 3,322,319 | 5/1967 | Sweeney et al. | 426/113 |
| 3,330,669 | 7/1967 | Hollenbeck | 426/415 |
| 3,427,169 | 2/1969 | Rose et al. | 426/415 |
| 3,567,119 | 3/1971 | Wilbert et al. | 426/415 |
| 3,603,454 | 9/1971 | Raaf | 426/124 |
| 3,615,595 | 10/1971 | Guttag | 426/85 |
| 3,645,760 | 2/1972 | O'Brien et al. | 426/415 |
| 3,824,322 | 7/1974 | Fiorella | 426/86 |
| 3,881,023 | 4/1975 | Wilson | 426/132 |
| 4,196,220 | 4/1980 | Chiu et al. | 426/415 |
| 4,299,851 | 11/1981 | Lowe | 426/113 |
| 4,781,931 | 11/1988 | Jon et al. | 426/132 |
| 4,834,993 | 5/1989 | Chiu | 426/415 |
| 4,874,622 | 10/1989 | Gaynor et al. | |
| 4,910,034 | 3/1990 | Winkler | 426/129 |
| 5,064,698 | 11/1991 | Courtright et al. | 426/415 |
| 5,288,532 | 2/1994 | Juhl | 426/415 |
| 5,374,457 | 12/1994 | Juhl et al. | 426/135 |

FOREIGN PATENT DOCUMENTS

| | | | |
|---|---|---|---|
| 1171838 | 7/1984 | Canada | 426/106 |
| 408164 | 1/1991 | European Pat. Off. | 426/132 |
| 2175946 | 10/1972 | France . | |
| 2356376 | 1/1978 | France . | |
| 970263 | 8/1958 | Germany . | |
| 52-070039 | 6/1977 | Japan | 426/132 |
| 62-138145 | 6/1987 | Japan | 426/132 |
| 1107094 | 3/1968 | United Kingdom . | |
| 1206047 | 9/1970 | United Kingdom | 426/415 |
| WO90/08478 | 8/1990 | WIPO | 486/132 |

OTHER PUBLICATIONS

Fleischwirtschaft 1978, 58 (1) 47–54; 74 (Dialog Abstract).
FD Flavor. Ingred. Process. Packag. 6(2) 41–5 1984 (Dialog Abstract).
Food Sci. Technol. Today 5(2), 74–8 1991 (Dialog Abstract).
Food Manufacture 1983, 58(1) 35,38,41 (Dialog Abstract).
Cereal Foods World 1992, 37(11) 834–835 (Dialog Abstract) 834–835.
Sustrelle Lab Manual Jun. 2, 1975.
Derwent Publications Ltd., London, GB, Week 7730, 10 Jun. 1977, Abstract of JP–A–52–070–039.
Derwent Publications Ltd., London, GB, Week 9109, 18 Jan. 1991, Abstract of JP–A–3–010–660.
Derwent Publications Ltd., London, GB, Week 8020, 20 Feb. 1980, Abstract of DD–140–196.

*Primary Examiner*—Steven Weinstein
*Attorney, Agent, or Firm*—Cushman Darby & Cushman Intellectual Property Group of Pillsbury Madison & Sutro LLP

[57] ABSTRACT

Edible foodstuff wrapping foil comprises collagen wherein the foil contains finely powdered spices as an integral ingredient.

8 Claims, No Drawings

SPICE IMPREGNATED EDIBLE WRAPPING FOIL

FIELD OF THE INVENTION

The invention relates to edible wrapping foils on the basis of collagen for foodstuffs.

BACKGROUND OF THE INVENTION

Edible flat collagen foils are known per se and are used to a large extent world-wide for wrapping food, such as hams. The production of collagen foils is described in DE-PS 642 922, for example. The use as wrapping for foodstuffs is known from, among others, DE-PS 19 45 527, and the use for wrapping meat products from U.S. Pat. No. 3,014,024. In what follows, collagen is understood to mean native and modified collagens as well as collagens whose solubility has been altered by enzyme treatment, for example; such collagens are described in, among others, DE-PS 17 67 613 and 19 60 395 or in U.S. Pat. No. 3,664,849.

It is also already known, for example from DE-PS 970 263, to provide wrapping materials for foodstuffs with soluble food coloring and flavoring, wherein it is intended for the flavor and the coloring to enter the foodstuffs wrapped in the material. In accordance with this publication it is possible to pull a sausage casing, for example, through an aqueous glycerine solution containing a soluble coloring for foodstuffs and a flavoring, such as alcoholic extracts of garlic or onions, or so-called liquid smoke. Thus the sausage casings are impregnated with soluble flavor and coloring materials, which are transferred to the wrapped foodstuffs during storage. The disadvantage with these known methods, however, is that it is only possible to transfer certain flavor variations by impregnating the wrapping foil with flavorings, because some soluble extracts of spices clearly differ in the olfactory range from freshly processed whole spices and, something which is even more important, as a rule such extracts are not stable in storage because a portion of the volatile components evaporates during storage and in this way the taste is changed, to which is added that spice extracts, whether alcoholic or aqueous, are sensitive to oxidation and temperature. The finer the spice preparations are dissolved, or the larger the area over which alcoholic or aqueous extracts are distributed, the quicker the change of the flavors because of evaporation or chemical changes, because of which the olfactory impression is changed, i.e. clearly worsens as a rule. Therefore the addition of soluble flavorings to wrapping foils which was customary up to now has not had any satisfactory results. On the other hand attempts to coat foils with spices in particle form later have also not had any success, since such coatings can only be applied with the aid of a binder or adhesive and furthermore larger and mostly sharp-edged spice particles often damage the relatively thin foils, particularly if the foils are stored in the form of rolls.

There is therefore a need for wrapping materials for foodstuffs of the most different types, which are at the same time suitable as carriers of flavorings and, if required, colorings.

SUMMARY OF THE INVENTION

In accordance with the invention, edible wrapping foils on the basis of collagen for foodstuffs are therefore proposed which are distinguished in that they contain finely divided spices as an integrated component.

It has be found in a surprising manner that the disadvantages connected with the subsequent sprinkling of finished foils or when using soluble flavoring extracts can be avoided, if collagen foils, known per se, which contain finely divided spices as an integral component of the foil are used as the base material for the wrapping. Integral component of the foil is understood to mean that the spice particles are embedded in the collagen foil and are at least partially enclosed in it. The preponderant part of the entire surface of the spices should preferably be inside the collagen layer of the foil which, however, does not preclude that later a portion of the particles is only partially embedded in the part of the foil facing the foodstuffs. In a preferred embodiment the wrapping foil has an essentially closed skin on its surface which later will face the exterior, which can constitute approximately 25% or less of the total thickness of the foil.

By employing the spices in the form of discrete particles which are mainly at least partially located inside the collagen layer of the foil, it is achieved that the highly volatile or relatively rapidly chemically changeable flavorings of the spices are also relatively well protected. The foils are preferably employed in this form if the foodstuffs wrapped in them are anyway placed into a further packaging foil for increasing storage life, for example in connection with pre-proportioned meat products or baked goods in the weldable polyester foils usual in commerce which are harmless in accordance with the food laws. If no additional packaging is to be used, it has been shown to be advantageous if the wrapping foil itself has an essentially closed skin on the side toward the exterior to prevent the exit of flavorings to the exterior and a high moisture loss. The thickness of the essentially closed skin can constitute approximately 25% or less of the total thickness of the foil. Since as a rule wrapping foils are marketed in the form of rolls, the "open" side of the foil with the totally or partially integrated spice particles is on the inside when it is rolled up, while the closed outer skin protects this side of the foil and, if the layer thickness is sufficient, also prevents damage to the surface by large or sharp-edged particles. In comparison with the wrapping materials known up to now, the wrapping foils in accordance with the invention are considerably more stable in storage and can be used in a more versatile manner, because a change in the flavorings is prevented to a large extent while, on the other hand, they have all the advantages of a wrapping foil of collagen in respect to gas permeability and moisture protection.

The wrapping foils in accordance with the invention can be prepared from collagen gels, whose production is described in DE-PS 642 922 or in WO 92/01394, for example. Prior to being placed in an extruder, the gel is homogeneously mixed with the finely divided spice particles, then transferred to an extruder and, in a manner known per se, extruded on a conveyor belt and further processed. In a preferred embodiment the gel, produced in a known manner, is transferred to an extruder and extruded on a conveyor belt which is covered with a thin layer of the spice in particle form, so that the spice particles are directly integrated and incorporated into the gel exiting the die. To obtain as closed a surface as possible, the particle size should be approximately ¾ of the layer thickness of the foil. The layer thickness of the foil depends on the intended use and as a rule varies between approximately 8 to 80, and preferably between 10 to 25 μm. The extruded foil is then adjusted in the usual manner to a preset pH value, dried and reconditioned to a preset water content. However, other methods for producing the foils in accordance with the invention are also possible, for example, the collagen gel can be mixed with the spice particles of desired size prior to extrusion and then this mixture can be extruded in the usual manner to form foils, onto which an essentially closed outer skin is then applied in a second production step in a manner known per se, before this dual-layered foil is dried and conditioned in the usual manner. Other production methods are also known to one skilled in the art because of his technical knowledge, for example the production of corresponding laminated foils by gluing with physiologically harmless adhesives which are permitted by the food laws.

It has been shown that in some cases it is desirable to work additional soluble flavor or coloring material into the collagen gel besides the spices in particle shape, and then to further process them in the manner mentioned, so that the foil simultaneously contains flavorings in dissolved as well as particle form. Buyers like a smoky flavor in many meat products, such as Kassel pork loin, or in some types of sausages, such as liverwurst, breast of goose, etc. Since so-called liquid smoke does not contain any particularly highly volatile compounds, these can then also be added in the form of a solution to the collagen gel which, itself, contains black pepper in particle form, for example. Similar is true for baked goods, because cinnamon, for example, is a very delicate spice and should therefore be put into the wrapping material only in particle form, while at the same time vanillin is remarkably oxidation- and temperature-stable and can therefore be employed as a solution. Besides the flavorings, the foils in accordance-with the invention can also additionally contain colorings in soluble or particle form to the extent that they are harmless in accordance with the food laws and, if a simultaneous coloring of the surface of the foodstuff is desired, such as again in the case of meat products or baked goods, for example.

DETAILED DESCRIPTION OF THE INVENTION

The edible wrappings in accordance with the invention can safely be consumed, since the collagen foils are completely decomposed in the body and their own taste is not noticed since as a rule they are very thin. The foils cannot only be used for foodstuffs with a "salty-spicy" taste, such as meat products, particularly ham, pre-proportioned pieces of roast meat and sausage, or cheese such as smoked cheese, for example, and other types of hard cheese, but also for foodstuffs with a "sweet" taste, in this case particularly with baked goods and pastries.

In cases where it is intended to process flavorings which are liquid from the start as the only or additional spice, such as maple syrup, soy sauce or the like, these products can either be used as soluble flavorings or they are applied on a carrier which is harmless in accordance with the food law, such as starch, prior to processing, or they are used in a micro-encapsulated form and can then be integrated into the foil in micro-encapsulated form like the other spices. Insoluble colorings and pigments, as well as flavorings applied to carriers or those present in a micro-encapsulated form are worked into the foil in accordance with one of the above mentioned methods, the same as the solid spice particles.

Angelica, anise, basil, mugwort, savory, borage, watercress, chili peppers, curcuma, dill, origanum, tarragon, fennel, galanga, cloves, ginger, sweet calamus, capers, cardamom, chervil, garlic, coriander, caraway, lovage, bayleaf, mazis, marjoram, balm, horseradish, poppy seed, nutmeg, oregano, paprika, parsnip, parsley, peppermint, pimiento, pimpernel root, rosemary, saffron, sage, sorrel, chives, celery, mustard, sesame seed, star aniseed, thyme, truffles, vanilla, juniper berry, woodruff, weinraute, hyssop, cinnamon, lemon, lemon balm, onion, as well as spice mixtures, such as curry or cajum, are particularly to be considered as spices or flavorings.

Besides these spices, the majority of which is oriented to the European taste, it is possible to process spices and spice mixtures such as are combined under the name ethnic food these days, parts of which are, for example, hartshorn seed, cubeb, benzoin, but also tonka beans or rose leaves.

The invention will be described in more detail below by means of examples.

EXAMPLE 1

Production of a Foil with Paprika Powder

To produce a collagen foil with paprika powder, 1% of paprika powder in relation to the entire mass, is added to the collagen suspension ready for processing. The mean grain size of the paprika powder was 10 μm, wherein approximately 80% of the powder used fell within this range during a grain size analysis, and the maximum diameter of the powder used was in the range of 15 μm. After even mixing of the mass it is extruded in a manner known per se in the form of a flat foil of a layer thickness of 20 μm with the aid of a suitable extrusion die, dried and reconditioned.

The foil is almost transparent and has a red hue corresponding to ripe red paprika. The foil smells intensely of paprika. The foil is preferably used for wrapping raw ham.

EXAMPLE 2

To produce a pepper foil, a mixture of black, white and red pepper is processed into a coarse powder wherein approximately 80% of the particle size lies in the range of 20 to 30 μm. This powder mixture is homogeneously applied to the conveyor belt for producing the foil by means of a spreading device. The collagen suspension is subsequently extruded onto the spread spice mixture in the form of a flat foil, wherein a continuous skin is formed on the side of the foil facing away from the conveyor belt. The foil is then dried and reconditioned in a manner known per se.

This foil can be easily rolled up, wherein the pepper layer comes to lie on the inside. Because of the different coloration of the grainy pepper powder the foil looks speckled and has an intense pepper smell. This foil can be used for wrapping raw ham or raw sausage.

EXAMPLE 3

A collagen suspension prepared for extrusion is mixed with 0.1% of vanillin in relation to the total weight of the mass to be processed, dissolved in water, and is thoroughly mixed. A thin layer of cinnamon powder of an average particle size of 5 to 8 μm is applied by means of a spreading device to the conveyor belt on which the foil is to be placed. Then the collagen suspension is extruded directly on the prepared conveyor belt by means of a suitable cast film die. The foil, which is almost transparent following drying and reconditioning, has a rich brown coloration and an intense odor of cinnamon and vanilla. This foil is preferably used for packaging sand-cake or similar backed goods.

We claim:

1. An edible collagen wrapping foil for wrapping foodstuffs, said wrapping foil having an inwardly oriented foodstuff contacting surface and an opposing outwardly oriented surface, said foil comprising collagen gel and finely divided spices in particle form, the finely divided spice particles being embedded in the collagen gel and at least partially enclosed in it, such that the flavor of said spice particles are transferable to a food to be wrapped in said foil through said inwardly oriented surface and wherein the outwardly oriented surface of the collagen foil has an essentially closed collagen skin sufficient to prevent both the exit of flavor of said spices through the outwardly oriented surface to the exterior and high moisture loss.

2. A wrapping foil in accordance with claim 1, characterized in that the preponderant portion of the total surface of the spice particles is located inside the collagen foil.

3. A wrapping coil in accordance with claim 1 or 2 characterized in that the spice particles are preponderantly located in the foil area that is adjacent the inwardly oriented food stuff contacting surface.

4. A wrapping foil in accordance with claim 1, characterized in that the the outwardly oriented surface of the foil has an essentially closed skin, which constitutes approximately 25% of the total layer thickness of the foil.

5. A wrapping foil in accordance with claim 4, characterized in that the foil additionally contains soluble flavorings.

6. A wrapping foil in accordance with claim 5, characterized in that the foil contains soluble flavorings in connection with inert carriers or in a micro-encapsulated form.

7. A wrapping foil in accordance with claim 6, characterized in that the foil furthermore contains insoluble, particle-shaped or soluble colorings.

8. A wrapping foil in accordance with claim 7, characterized in that the thickness of the foil is approximately 10 to 40 μm.

* * * * *